United States Patent [19]

Suzuki et al.

[11] Patent Number: 5,041,988
[45] Date of Patent: Aug. 20, 1991

[54] METHOD AND DEVICE FOR MEASURING A SURFACE CONTOUR

[75] Inventors: Toru Suzuki; Masatoshi Arai, both of Tokyo, Japan

[73] Assignee: Tokyo Seimitsu Co., Ltd., Tokyo, Japan

[21] Appl. No.: 403,359

[22] Filed: Sep. 6, 1989

[30] Foreign Application Priority Data

Sep. 19, 1988 [JP] Japan ................... 63-232661

[51] Int. Cl.$^5$ ................................ G01B 5/00
[52] U.S. Cl. .................... 364/506; 364/577
[58] Field of Search ............ 364/506, 474.29, 474.24, 364/474.37, 560, 577; 33/535, 545, 550, 551

[56] References Cited

U.S. PATENT DOCUMENTS 4,807,132  2/1989  Lane et al. ............ 364/474.37

OTHER PUBLICATIONS

Japanese Patent Publ. of Appln. 63-59444.
Japanese Patent Appl. Laid-open No. 51-105848.
Japanese Patent Publ. of Appln. 54-21271.
Japanese Patent Publ. of Appln. No. 54-26387.
Japanese Patent Appl. Laid-open No. 52-49859.

*Primary Examiner*—Parshotam S. Lall
*Assistant Examiner*—Ellis B. Ramirez
*Attorney, Agent, or Firm*—Sixbey, Friedman, Leedom & Ferguson

[57] ABSTRACT

A method and device for measuring the surface contour such as the surface roughness of a member to be measured having a curved surface shape. In the surface contour measuring device, a cubic curved line corresponding to the curved surface of the member to be measured is obtained from a measurement signal according to a method of least squares, and the cubic curved line is removed from the measurement signal to obtain a roughness curved line, so that, even when the member to be measured has a curved surface, the surface roughness of the member can be obtained with accuracy.

6 Claims, 4 Drawing Sheets

METHOD AND DEVICE FOR MEASURING A SURFACE CONTOUR

BACKGROUND OF THE INVENTION

1. Field of the Invention

The present invention relates to a method and device for measuring contour such as surface roughness and the like and, in particular, to such a method and device which is used to measure the surface roughness and the like of a work having a curved shape.

2. Description of the Related Art

Conventionally, a surface roughness and contour measuring machine includes several types of measuring machines as follows:

A. A measuring machine in which an average height in the front and rear portions of the measured length of a work is found, an average straight line is found from the average height value, and the average straight line is subtracted from a measured curved line so as to find the surface roughness of the work.

B. A measuring machine in which an average straight line is obtained by a method of least squares over the whole measured length of a work, and the average straight line is subtracted from a measured curved line so as to find the surface roughness of the work.

C. A measuring machine used for measuring a work having a circular arc shape, in which the radius of curvature of the work is previously obtained and circular arc component is removed from a roughness curved line according to an equation of circle so as to find the roughness of the work.

D. A measuring machine in which a circular-arc-shaped reference surface is prepared and a detector is moved to follow the reference surface to thereby remove a circular arc component so as to find the roughness of the work.

However, in the above-mentioned A and B types of measuring machines, the curved surface shape of a work cannot be corrected and, therefore, it is impossible to measure the roughness of the curved surface shape of the work. Also, in the C and D types when the radius of curvature of a work is not known, it is impossible to measure the roughness of the work surface. Further, the C and D types of measuring machines cannot be applied to other works than those having a circular-arc-shaped curved surface. In addition, in the C and D types of measuring machines, the center of the drive part of a contact pointer must be matched with the center of a reference surface having a circular arc shape, but such matching or alignment is difficult.

SUMMARY OF THE INVENTION

The present invention aims at eliminating the drawbacks found in the above-mentioned prior art measuring machines.

Accordingly, it is an object of the invention to provide a method and device for measuring a surface contour which is capable of accurately measuring the surface roughness and the like of a work having a curved surface shape.

In order to accomplish the above object, according to the invention, there is provided a measuring apparatus in which the surface shape of a work to be measured is measured in a contact manner or in a non-contact manner, and a measurement signal obtained by such measurement is processed to thereby find the contour shape such as the surface roughness of the work, the measuring apparatus comprising: an operation part for finding a cubic curve along the contour shape of the work from the measurement signal using a method of least squares and then removing a cubic curve signal component from the measurement signal to output a roughness curve signal; and, filter means connected in series with the operation part for removing a given band component of the roughness curve signal component.

According to the method and device for measuring a surface contour of the invention, a cubic curve corresponding to the curved shape of a work is obtained from a measurement signal according to a method of least squares and the cubic curve is removed from the measurement signal to thereby find a roughness curve, so that even when the work has a curved shape, the surface roughness of the work can be obtained with accuracy.

BRIEF DESCRIPTION OF THE DRAWINGS

The exact nature of this invention, as well as other objects and advantages thereof, will be readily apparent from consideration of the following specification relating to the accompanying drawings, in which like reference characters designate the same or similar parts throughout the figures thereof and wherein.

DETAILED DESCRIPTION OF THE INVENTION

Detailed description will hereunder be given of the preferred embodiments of a method and device for measuring a surface contour according to the present invention with reference to the accompanying drawings.

Figure 1:
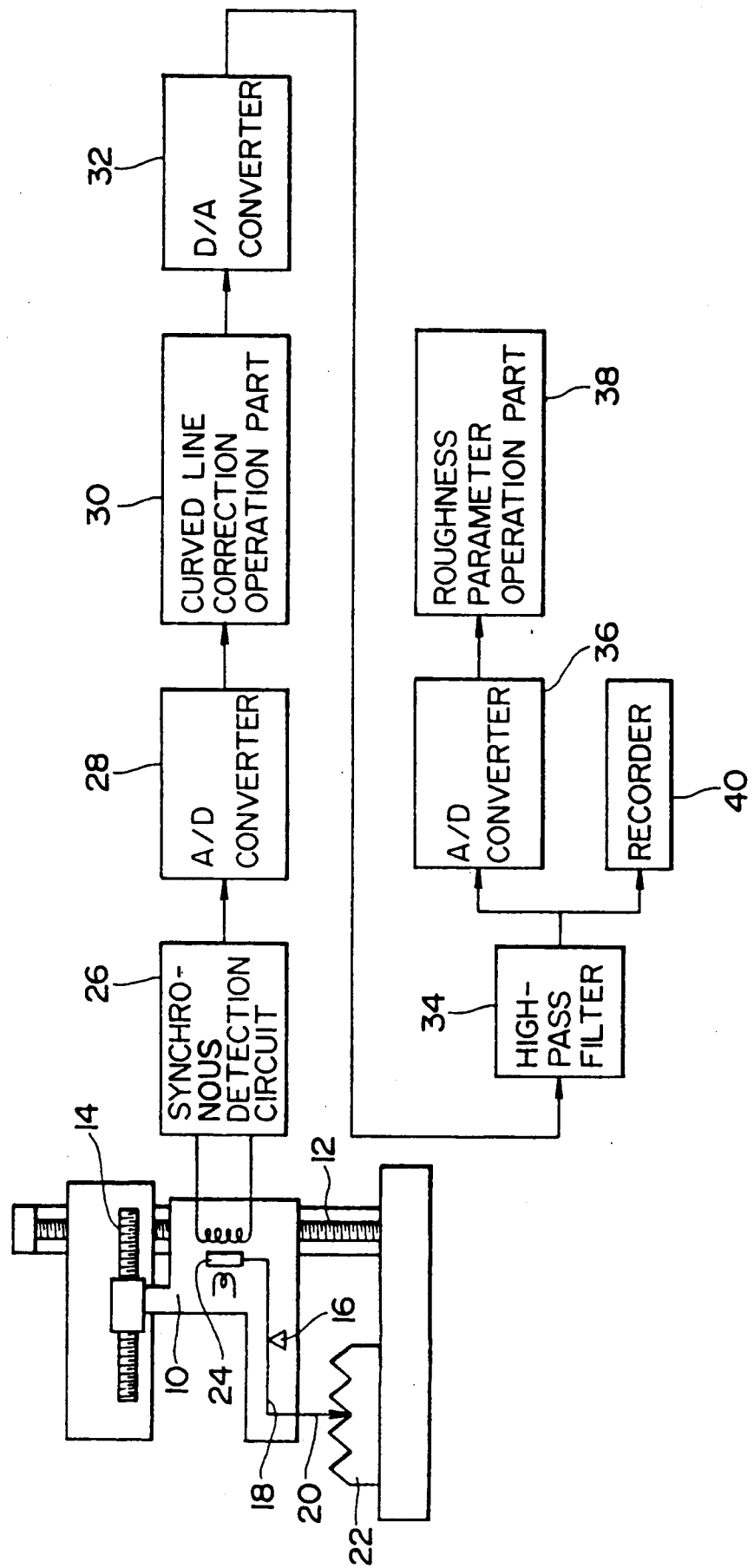
FIG. 1 is a block diagram of the structure of an embodiment of a method and device for measuring a surface contour according to the invention.

Referring first to FIG. 1, there is shown a block diagram of the structure of an embodiment of a method and device for measuring a surface contour according to the invention. In FIG. 1, there is provided a measuring part 10 which can be freely moved in a vertical direction by rotating a vertically extending screw stock 12 and also which can be set at the height of a work 22. The measuring part 10 can also be moved freely right and left by rotating a horizontally extending screw stock 14, that is, the measuring part 10 is movable in contact with the surface of the work 22. In the measuring part 10, there is provided a measuring member 18 which can be oscillated by means of a fulcrum 16. In one end of the measuring member 18, there is disposed a contact pointer 20 which can be moved in contact with the surface of the work 22. The vertical movements of the contact pointer 20 can be transmitted to a core 24 of a differential transformer disposed in the other end of the measuring member 18.

The movements of the core 24 are converted to electric signals which are then transmitted to a synchronous detection circuit 26. In the synchronous detection circuit 26, carrier components are removed out of the outputs from the differential transformer to thereby pick up only measurement signal components. The measurement signal is processed by an A/D converter to a digital signal which is then transmitted to a curve correction operation part 30.

In the curve correction operation part 30, there is obtained a curved line which is included in the measurement signal and corresponds to a curved surface shape, and the curved line is subtracted from the measurement signal to thereby obtain a roughness curved line. That is, a cubic curve correction is made on the measurement data according to a method of least squares.

Now, the measurement data, which consists of n pieces of data (INDEX i=1~n), is expressed as follows:

$$Y_i = F(x_i) \tag{1}$$

A least squares cubic curved line (correction curved line) is expressed as follows:

$$Y_i = ax_i^3 + bx_i^2 + cx_i + d \tag{2}$$

if a residual between equations (1) and (2) is expressed as $U_i$, then a following equation is obtained.

$$U_i = Y_i - ax_i^3 - bx_i^2 - cx_i - d \tag{3}$$

In order that the equation (2) can be a least square approximate function of the equation (1), the sum S of squares of the residual must be the smallest.

$$\begin{aligned} S &= \sum_{i=1}^{n} U_i^2 \\ &= \sum_{i=1}^{n} (Y_i - aX_i^3 - bX_i^2 - cX_i - d)^2 \\ &= \sum_{i=1}^{n} \{ Y_i^2 - 2Y_i(aX_i^3 + bX_i^2 + cX_i + d) + \\ &\quad a^2 X_i^6 + 2abX_i^5 + b^2 X_i^4 + 2acX_i^4 + 2adX_i^3 + \\ &\quad 2bcX_i^3 + 2bdX_i^2 + c^2 X_i^2 + 2cdX_i + d^2 \} \end{aligned} \tag{4}$$

Then, the partial differential components of S with respect to coefficients a, b, c, and d become zero. That is, S takes the minimal value and, therefore, the following simultaneous equations hold.

$$\frac{\delta S}{\delta a} = \sum_{i=1}^{n} \{-2Y_i X_i^3 + 2aX_i^6 + 2bX_i^5 + 2cX_i^4 + 2dX_i^3\} = 0 \tag{5}$$

$$\frac{\delta S}{\delta b} = \sum_{i=1}^{n} \{-2Y_i X_i^2 + 2aX_i^5 + 2bX_i^4 + 2cX_i^3 + 2dX_i^2\} = 0$$

$$\frac{\delta S}{\delta c} = \sum_{i=1}^{n} \{-2Y_i X_i + 2aX_i^4 + 2bX_i^3 + 2cX_i^2 + 2dX_i\} = 0$$

$$\frac{\delta S}{\delta d} = \sum_{i=1}^{n} \{-2Y_i + 2aX_i^3 + 2bX_i^2 + 2cX_i + 2d\} = 0$$

Clearing of them, we have the following simultaneous equations $$\begin{pmatrix} \sum_{i=1}^{n} X_i^6, & \sum_{i=1}^{n} X_i^5, & \sum_{i=1}^{n} X_i^4, & \sum_{i=1}^{n} X_i^3 \\ \sum_{i=1}^{n} X_i^5, & \sum_{i=1}^{n} X_i^4, & \sum_{i=1}^{n} X_i^3, & \sum_{i=1}^{n} X_i^2 \\ \sum_{i=1}^{n} X_i^4, & \sum_{i=1}^{n} X_i^3, & \sum_{i=1}^{n} X_i^2, & \sum_{i=1}^{n} X_i \\ \sum_{i=1}^{n} X_i^3, & \sum_{i=1}^{n} X_i^2, & \sum_{i=1}^{n} X_i, & n \end{pmatrix} \begin{pmatrix} a \\ b \\ c \\ d \end{pmatrix} = \begin{pmatrix} \sum_{i=1}^{n} Y_i X_i^3 \\ \sum_{i=1}^{n} Y_i X_i^2 \\ \sum_{i=1}^{n} Y_i X_i \\ \sum_{i=1}^{n} Y_i \end{pmatrix} \tag{6}$$

and we solve the above simultaneous equations (6) according to Cramer's formula.

$$\text{Setting } D = \begin{vmatrix} \sum_{i=1}^{n} X_i^6, & \sum_{i=1}^{n} X_i^5, & \sum_{i=1}^{n} X_i^4, & \sum_{i=1}^{n} X_i^3 \\ \sum_{i=1}^{n} X_i^5, & \sum_{i=1}^{n} X_i^4, & \sum_{i=1}^{n} X_i^3, & \sum_{i=1}^{n} X_i^2 \\ \sum_{i=1}^{n} X_i^4, & \sum_{i=1}^{n} X_i^3, & \sum_{i=1}^{n} X_i^2, & \sum_{i=1}^{n} X_i \\ \sum_{i=1}^{n} X_i^3, & \sum_{i=1}^{n} X_i^2, & \sum_{i=1}^{n} X_i, & n \end{vmatrix} \tag{7}$$

we have the following equations (8), (9), (10), (11).

$$a = \frac{1}{D} \begin{pmatrix} \sum_{i=1}^{n} X_i^3 Y_i, & \sum_{i=1}^{n} X_i^5, & \sum_{i=1}^{n} X_i^4, & \sum_{i=1}^{n} X_i^3 \\ \sum_{i=1}^{n} X_i^2 Y_i, & \sum_{i=1}^{n} X_i^4, & \sum_{i=1}^{n} X_i^3, & \sum_{i=1}^{n} X_i^2 \\ \sum_{i=1}^{n} X_i Y_i, & \sum_{i=1}^{n} X_i^3, & \sum_{i=1}^{n} X_i^2, & \sum_{i=1}^{n} X_i \\ \sum_{i=1}^{n} Y_i, & \sum_{i=1}^{n} X_i^2, & \sum_{i=1}^{n} X_i, & n \end{pmatrix} \tag{8}$$

$$b = \frac{1}{D} \begin{pmatrix} \sum_{i=1}^{n} X_i^6, & \sum_{i=1}^{n} X_i^3 Y_i, & \sum_{i=1}^{n} X_i^4, & \sum_{i=1}^{n} X_i^3 \\ \sum_{i=1}^{n} X_i^5, & \sum_{i=1}^{n} X_i^2 Y_i, & \sum_{i=1}^{n} X_i^3, & \sum_{i=1}^{n} X_i^2 \\ \sum_{i=1}^{n} X_i^4, & \sum_{i=1}^{n} X_i Y_i, & \sum_{i=1}^{n} X_i^2, & \sum_{i=1}^{n} X_i \\ \sum_{i=1}^{n} X_i^3, & \sum_{i=1}^{n} Y_i, & \sum_{i=1}^{n} X_i, & n \end{pmatrix} \tag{9}$$

$$c = \frac{1}{D} \begin{pmatrix} \sum_{i=1}^{n} X_i^6, & \sum_{i=1}^{n} X_i^5, & \sum_{i=1}^{n} X_i^3 Y_i, & \sum_{i=1}^{n} X_i^3 \\ \sum_{i=1}^{n} X_i^5, & \sum_{i=1}^{n} X_i^4, & \sum_{i=1}^{n} X_i^2 Y_i, & \sum_{i=1}^{n} X_i^2 \\ \sum_{i=1}^{n} X_i^4, & \sum_{i=1}^{n} X_i^3, & \sum_{i=1}^{n} X_i Y_i, & \sum_{i=1}^{n} X_i \\ \sum_{i=1}^{n} X_i^3, & \sum_{i=1}^{n} X_i^2, & \sum_{i=1}^{n} Y_i, & n \end{pmatrix} \tag{10}$$

$$d = \frac{1}{D} \begin{pmatrix} \sum_{i=1}^{n} X_i^6, & \sum_{i=1}^{n} X_i^5, & \sum_{i=1}^{n} X_i^4, & \sum_{i=1}^{n} X_i^3 Y_i \\ \sum_{i=1}^{n} X_i^5, & \sum_{i=1}^{n} X_i^4, & \sum_{i=1}^{n} X_i^3, & \sum_{i=1}^{n} X_i^2 Y_i \\ \sum_{i=1}^{n} X_i^4, & \sum_{i=1}^{n} X_i^3, & \sum_{i=1}^{n} X_i^2, & \sum_{i=1}^{n} X_i Y_i \\ \sum_{i=1}^{n} X_i^3, & \sum_{i=1}^{n} X_i^2, & \sum_{i=1}^{n} X_i, & \sum_{i=1}^{n} Y_i \end{pmatrix} \tag{11}$$

The coefficients a, b, c, and d can be found by the equations (7), (8), (9), (10), (11), respectively.

Here, if $X_i$ can be expressed by a sequence of integers, 1~n, then $$S_1 = \sum_{i=1}^{n} X_i = \frac{1}{2} n(n+1)$$

$$S_2 = \sum_{i=1}^{n} X_i^2 = \frac{1}{6} n(n+1)(2n+1)$$

$$S_3 = \sum_{i=1}^{n} X_i^3 = \frac{1}{4} n^2(n+1)^2$$

$$S_4 = \sum_{i=1}^{n} X_i^4 = \frac{1}{30} n(n+1)(2n+1)(3n^2+3n-1)$$

$$S_5 = \sum_{i=1}^{n} X_i^5 = \frac{1}{12} n^2(n+1)^2(2n^2+2n-1)$$

$$S_6 = \sum_{i=1}^{n} X_i^6 = \frac{1}{42} n(n+1)(2n+1)(3n^4+6n^3-3n+1)$$

and all that need to be summed are.

$$\sum_{i=1}^{n} Y_i, \sum_{i=1}^{n} X_i Y_i, \sum_{i=1}^{n} X_i^2 Y_i, \sum_{i=1}^{n} X_i^3 Y_i$$

Therefore, the least square cubic curve of the equation (2) can be obtained only by means of operations of the determinats of (7) to (11), only by calculating.

Accordingly, if the least square cubic curve of the equation (2) obtained is subtracted from the equation (1) on the measurement data, then there can be found a surface roughness signal. This surface roughness signal is converted by a D/A converter 32 into an analog signal which is then transmitted to a high-pass filter 34. In the high-pass filter 34, a swelling signal component is removed from the analog signal and then the analog signal is transmitted to an A/D converter 36 or a recorder 40. In the A/D converter 36, the analog signal is converted to a digital signal and is then transmitted to a parameter operation part 38, in which the digital signal is used to find a roughness parameter. That is, there is obtained the roughness parameter which includes a center line average roughness Ra, the maximum height Rt and the like. Also, in the recorder 40, there is displayed a roughness curve (it should be noted here that the filtering treatment can be alternatively enforced by use of a digital filter as well).

Figure 2:
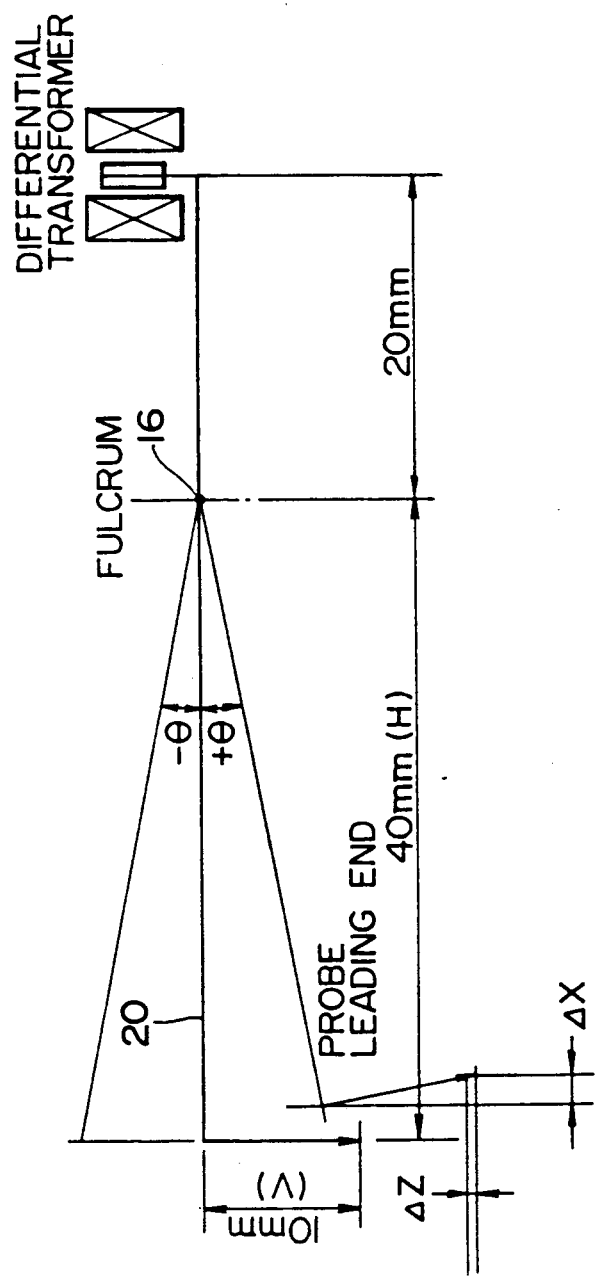
FIG. 2 is an explanatory view of the shape of a measuring member.
Figure 3A:
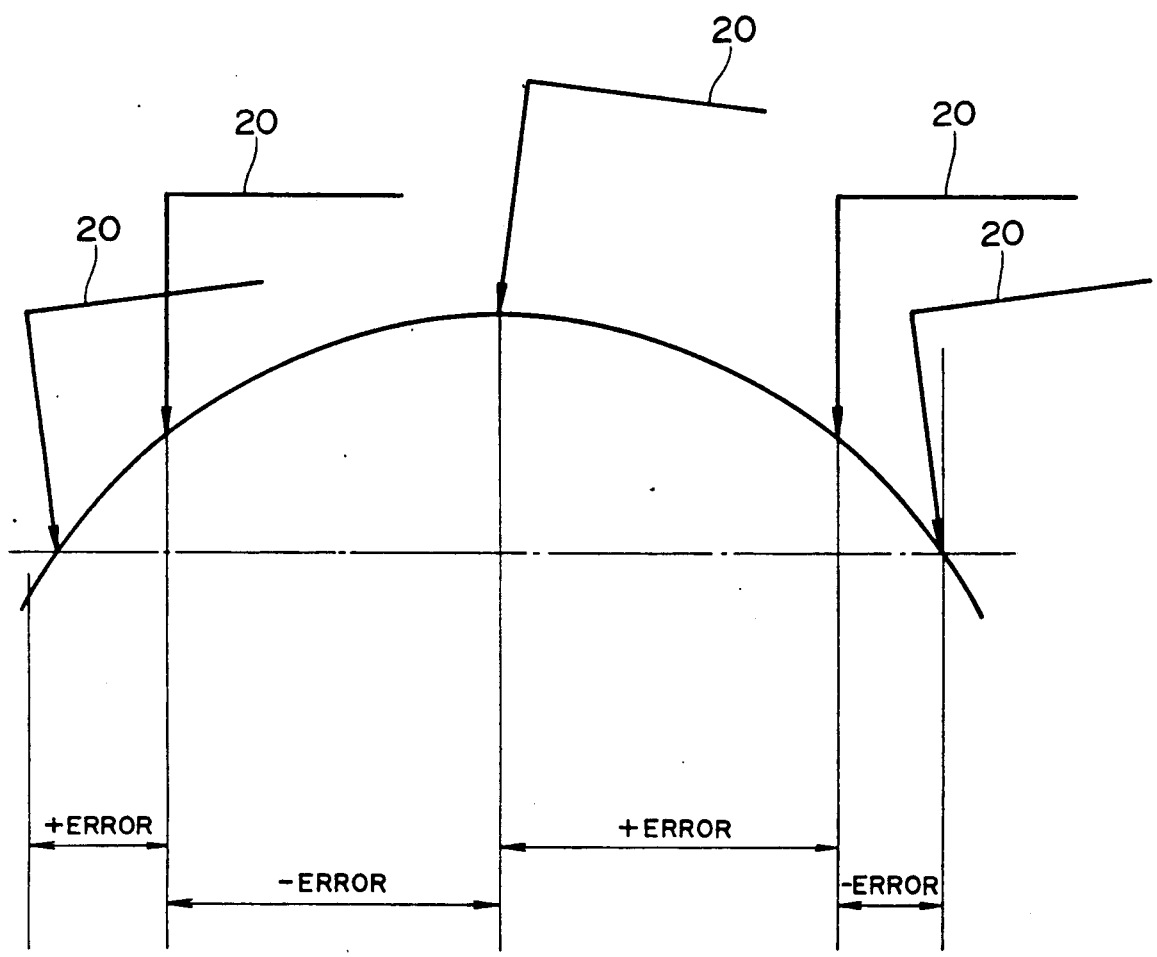
FIGS. 3A-3B are explanatory view to illustrate a relationship between a curved surface shape and a contact pointer; and, FIG. 4 is a block diagram of the structure of a second embodiment according to the invention.

Here, description will be given of the reason why the least square cubic curve is obtained, not a least square quadratic curve. When a circular-arc-shaped curved surface is measured by use of the contact probe 20 shown in FIG. 2, as shown in FIG. 3(A), the contact probe 20 is moved about the fulcrum 16 in an circular-arc manner. When the contact probe 20 is rotated by an amount of $\theta$, then the amount of error movements of the leading end of the contact probe can be found by the following equation:

$$\Delta X = H(1-\cos\theta) + V \sin\theta \approx V \sin\theta$$

$$\Delta Z = V(1-\cos\theta)$$

Here is shown a relationship between the maximum angle of deviation $\alpha_{max}$ and $\Delta X$, $\Delta Z$, in each of magnifications.

As can be understood from the following table, the values of $\Delta X$ are very large.

| | $\alpha$max (deg) | $\Delta X$ ($\mu$m) | $\Delta Z$ ($\mu$m) Resolution ($\mu$m) | $\Delta Z$/FULL SCALE |
|---|---|---|---|---|
| ×100 ($\pm$400 $\mu$m) | $\pm$0.57 | +100 −100 | +2.0 −0.2 | 0.5% |
| ×200 ($\pm$400 $\mu$m) | $\pm$0.57 | +100 −100 | +2.0 −0.2 | 0.5% |
| ×500 ($\pm$200 $\mu$m) | $\pm$0.29 | +50 −50 | +0.12 −0.1 | 0.06% |
| ×1K ($\pm$200 $\mu$m) | $\pm$0.29 | +50 −50 | +0.12 −0.1 | 0.06% |
| ×2K ($\pm$80 $\mu$m) | $\pm$0.11 | +20 −20 | +0.02 −0.04 | 0.025% |
| ×5K ($\pm$80 $\mu$m) | $\pm$0.11 | +20 −20 | +0.02 −0.04 | 0.025% |
| ×10K ($\pm$40 $\mu$m) | $\pm$0.057 | +10 −10 | +0.0005 0.02 | 0.00125% |
| ×20K ($\pm$20 $\mu$m) | $\pm$0.029 | +5 −5 | $\Delta Z$ is less than Resolution | $\approx 0$ |
| ×50K ($\pm$8 $\mu$m) | $\pm$0.011 | +2 −2 | $\Delta Z$ is less than Resolution | $\approx 0$ |
| ×100K ($\pm$4 $\mu$m) | $\pm$0.0057 | +1 −1 | $\Delta Z$ is less than Resolution | $\approx 0$ |

Figure 3B:
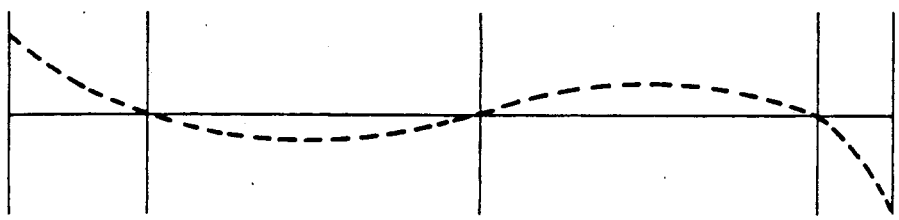

Also, as shown in FIG. 3(B), the data shows a cubic curve and, even the measurement data of a cubic curve is corrected by a quadratic curve, the cubic curve component is left. For this reason, the correction by a quadratic curve is not sufficient and the correction by a cubic curve is necessary. Also, corrections by means of a quadraitic or other curves of higher orders are theoretically possible, but such corrections are open to operational errors and thus are not practical.

Figure 4:
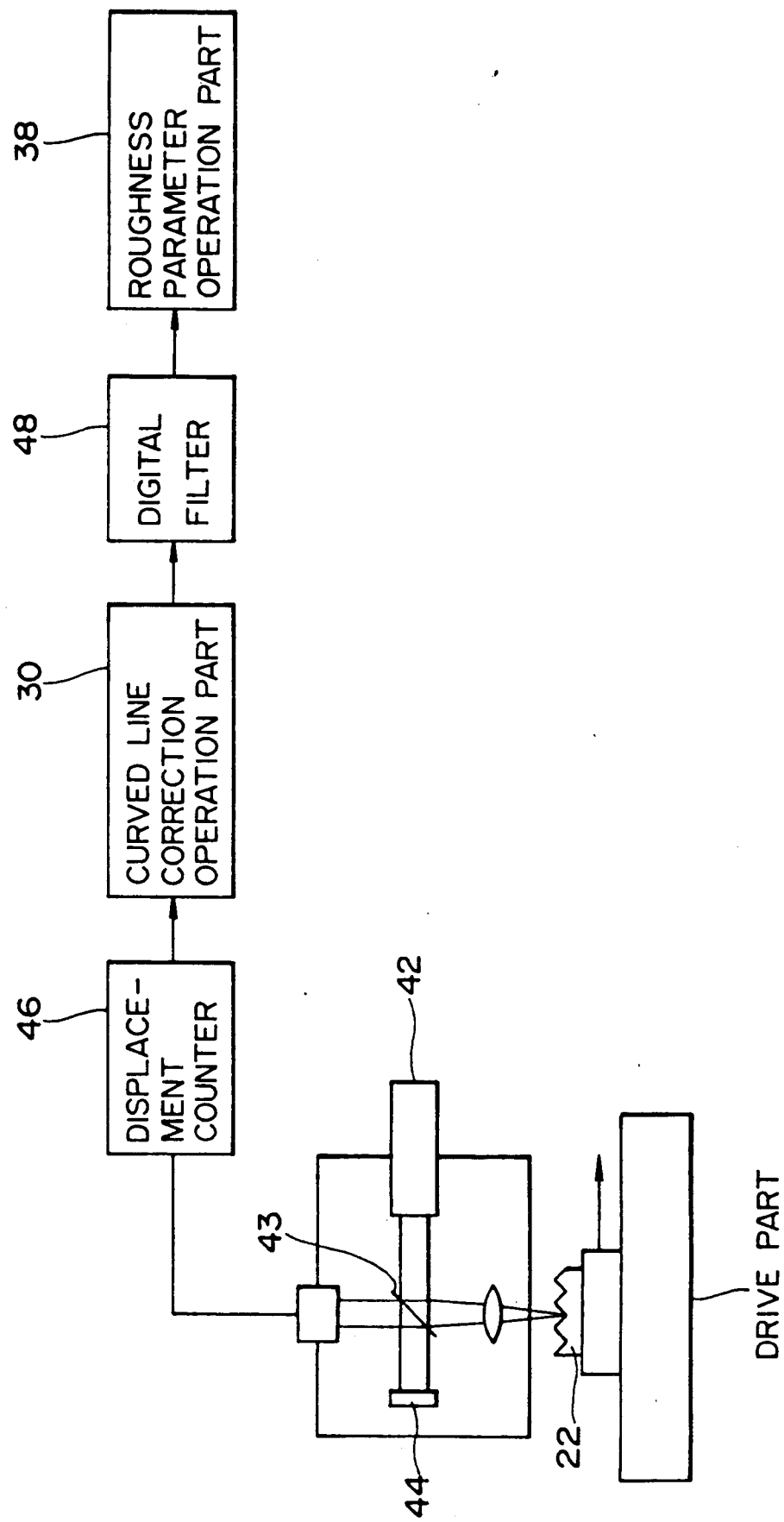

Now, in FIG. 4, there is shown a block diagram of the structure of a second embodiment of a surface texture and contour measuring instrument according to the invention. In the second embodiment, there is shown a surface texture and contour measuring instrument of a digital type. That is, light coming from a light source 42, which forms a Michelson interferometer, is reflected by a half mirror 43 and is then radiated onto the surface of the work 22. The reflected light interferes with light reflected from a reference surface and produces an interference fringe. The thus produced interference fringe is counted by a displacement counter 46 and is then transmitted to the curve correction operation part 30. In the curve correction operation part 30, as in the first embodiment of the invention, a cubic curve of the equation (2) is obtained and then this cubic curve is subtracted from the equation (1) to find a surface roughness. The measurement signal is transmitted to a digital filter 48, in which a swelling signal component is removed from the measurement signal. Processings by the roughness parameter operation part 38 are similar to those in the first embodiment.

As has been described hereinbefore, the surface texture and contour measuring instrument according to the invention is capable of finding a curved line of a curved surface shape from the measurement data by use of the least square method and is also capable of finding a roughness curved line by removing the curved line from the measurement data. Therefore, according to the present instrument, the roughness of any kinds of curved surfaces can be measured with accuracy.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A method of measuring the surface roughness of a member comprising the steps of:
   (i) measuring the surface contour of said member with a measuring part to generate a surface contour measurement signal;
   (ii) determining a cubic curve corresponding to said surface contour with a curve correction operation part from said measurement signal according to a method of least squares;
   (iii) generating a roughness curve line signal by removing said cubic curve from said measurement signal;
   (iv) removing a given bandwidth component from said roughness curve line signal with a filter means to generate the roughness contour of said member.

2. A method as set forth in claim 1, where the measurement data of said measurement signal is expressed by $$Y_i = F(x_i) \tag{1}$$

a least squares cubic curved line (a correction curved line) to be found is expressed by $$Y_i = ax_i^3 + bx_i^2 + cx_i + d \tag{2}$$

a residual between said two equations (1) and (2) is expressed by $$U_i = Y_i - ax_i^3 - bx_i^2 - cx_i - d \tag{3}$$

a residual sum of squares S is expressed by $$S = \sum_{i=1}^{n} U_i^2 \tag{4}$$

$$= \sum_{i=1}^{n} (Y_i - aX_i^3 - bX_i^2 - cX_i - d)^2$$

$$= \sum_{i=1}^{n} \{Y_i^2 - 2Y_i(aX_i^3 + bX_i^2 + cX_i + d) +$$
$$a^2 X_i^6 + 2ab X_i^5 + b^2 X_i^4 + 2ac X_i^4 + 2ad X_i^3 +$$
$$2bc X_i^3 + 2bd X_i^2 + c^2 X_i^2 + 2cd X_i + d^2\}$$

four simultaneous equations relating to coefficients a, b, c and d are expressed by $$\frac{\delta S}{\delta a} = \sum_{i=1}^{n} \{-2Y_i X_i^3 + 2a X_i^6 + 2b X_i^5 + 2c X_i^4 + 2d X_i^3\} = 0 \tag{5}$$

$$\frac{\delta S}{\delta b} = \sum_{i=1}^{n} \{-2Y_i X_i^2 + 2a X_i^5 + 2b X_i^4 + 2c X_i^3 + 2d X_i^2\} = 0$$

$$\frac{\delta S}{\delta c} = \sum_{i=1}^{n} \{-2Y_i X_i + 2a X_i^4 + 2b X_i^3 + 2c X_i^2 + 2d X_i\} = 0$$

$$\frac{\delta S}{\delta d} = \sum_{i=1}^{n} \{-2Y_i + 2a X_i^3 + 2b X_i^2 + 2c X_i + 2d\} = 0$$

said four simultaneous equations are arranged to provide $$\begin{pmatrix} \sum_{i=1}^{n} X_i^6, & \sum_{i=1}^{n} X_i^5, & \sum_{i=1}^{n} X_i^4, & \sum_{i=1}^{n} X_i^3 \\ \sum_{i=1}^{n} X_i^5, & \sum_{i=1}^{n} X_i^4, & \sum_{i=1}^{n} X_i^3, & \sum_{i=1}^{n} X_i^2 \\ \sum_{i=1}^{n} X_i^4, & \sum_{i=1}^{n} X_i^3, & \sum_{i=1}^{n} X_i^2, & \sum_{i=1}^{n} X_i \\ \sum_{i=1}^{n} X_i^3, & \sum_{i=1}^{n} X_i^2, & \sum_{i=1}^{n} X_i, & n \end{pmatrix} \begin{pmatrix} a \\ b \\ c \\ d \end{pmatrix} = \begin{pmatrix} \sum_{i=1}^{n} Y_i X_i^3 \\ \sum_{i=1}^{n} Y_i X_i^2 \\ \sum_{i=1}^{n} Y_i X_i \\ \sum_{i=1}^{n} Y_i \end{pmatrix} \tag{6}$$

said simultaneous equations of (6) are solved according to Cramer's law, if D is expressed by $$D = \begin{vmatrix} \sum_{i=1}^{n} X_i^6, & \sum_{i=1}^{n} X_i^5, & \sum_{i=1}^{n} X_i^4, & \sum_{i=1}^{n} X_i^3 \\ \sum_{i=1}^{n} X_i^5, & \sum_{i=1}^{n} X_i^4, & \sum_{i=1}^{n} X_i^3, & \sum_{i=1}^{n} X_i^2 \\ \sum_{i=1}^{n} X_i^4, & \sum_{i=1}^{n} X_i^3, & \sum_{i=1}^{n} X_i^2, & \sum_{i=1}^{n} X_i \\ \sum_{i=1}^{n} X_i^3, & \sum_{i=1}^{n} X_i^2, & \sum_{i=1}^{n} X_i, & n \end{vmatrix} \tag{7}$$

then said coefficients are expressed by $$a = \frac{1}{D} \begin{vmatrix} \sum_{i=1}^{n} X_i^3 Y_i, & \sum_{i=1}^{n} X_i^5, & \sum_{i=1}^{n} X_i^4, & \sum_{i=1}^{n} X_i^3 \\ \sum_{i=1}^{n} X_i^2 Y_i, & \sum_{i=1}^{n} X_i^4, & \sum_{i=1}^{n} X_i^3, & \sum_{i=1}^{n} X_i^2 \\ \sum_{i=1}^{n} X_i Y_i, & \sum_{i=1}^{n} X_i^3, & \sum_{i=1}^{n} X_i^2, & \sum_{i=1}^{n} X_i \\ \sum_{i=1}^{n} Y_i, & \sum_{i=1}^{n} X_i^2, & \sum_{i=1}^{n} X_i, & n \end{vmatrix} \tag{8}$$

$$b = \frac{1}{D} \begin{vmatrix} \sum_{i=1}^{n} X_i^6, & \sum_{i=1}^{n} X_i^3 Y_i, & \sum_{i=1}^{n} X_i^4, & \sum_{i=1}^{n} X_i^3 \\ \sum_{i=1}^{n} X_i^5, & \sum_{i=1}^{n} X_i^2 Y_i, & \sum_{i=1}^{n} X_i^3, & \sum_{i=1}^{n} X_i^2 \\ \sum_{i=1}^{n} X_i^4, & \sum_{i=1}^{n} X_i Y_i, & \sum_{i=1}^{n} X_i^2, & \sum_{i=1}^{n} X_i \\ \sum_{i=1}^{n} X_i^3, & \sum_{i=1}^{n} Y_i, & \sum_{i=1}^{n} X_i, & n \end{vmatrix} \tag{9}$$

$$c = \frac{1}{D} \begin{vmatrix} \sum_{i=1}^{n} X_i^6, & \sum_{i=1}^{n} X_i^5, & \sum_{i=1}^{n} X_i^3 Y_i, & \sum_{i=1}^{n} X_i^3 \\ \sum_{i=1}^{n} X_i^5, & \sum_{i=1}^{n} X_i^4, & \sum_{i=1}^{n} X_i^2 Y_i, & \sum_{i=1}^{n} X_i^2 \\ \sum_{i=1}^{n} X_i^4, & \sum_{i=1}^{n} X_i^3, & \sum_{i=1}^{n} X_i Y_i, & \sum_{i=1}^{n} X_i \\ \sum_{i=1}^{n} X_i^3, & \sum_{i=1}^{n} X_i^2, & \sum_{i=1}^{n} Y_i, & n \end{vmatrix} \tag{10}$$

$$d = \frac{1}{D} \begin{vmatrix} \sum_{i=1}^{n} X_i^6, & \sum_{i=1}^{n} X_i^5, & \sum_{i=1}^{n} X_i^4, & \sum_{i=1}^{n} X_i^3 Y_i \\ \sum_{i=1}^{n} X_i^5, & \sum_{i=1}^{n} X_i^4, & \sum_{i=1}^{n} X_i^3, & \sum_{i=1}^{n} X_i^2 Y_i \end{vmatrix} \tag{11}$$

-continued $$\begin{pmatrix} \sum_{i=1}^{n} X_i^4, & \sum_{i=1}^{n} X_i^3, & \sum_{i=1}^{n} X_i^2, & \sum_{i=1}^{n} X_i Y_i \\ \sum_{i=1}^{n} X_i^3, & \sum_{i=1}^{n} X_i^2, & \sum_{i=1}^{n} X_i, & \sum_{i=1}^{n} Y_i \end{pmatrix}$$

said coefficients a, b, c, d are found from said equations (7), (8), (9), (10), (11), if $X_i$ is expressed by a sequence of integers $1 \sim n$, then there are obtained equations $$S_1 = \sum_{i=1}^{n} X_i = \frac{1}{2} n(n+1)$$

$$S_2 = \sum_{i=1}^{n} X_i^2 = \frac{1}{6} n(n+1)(2n+1)$$

$$S_3 = \sum_{i=1}^{n} X_i^3 = \frac{1}{4} n^2(n+1)^2$$

$$S_4 = \sum_{i=1}^{n} X_i^4 = \frac{1}{30} n(n+1)(2n+1)(3n^2+3n-1)$$

$$S_5 = \sum_{i=1}^{n} X_i^5 = \frac{1}{12} n^2(n+1)^2(2n^2+2n-1)$$

$$S_6 = \sum_{i=1}^{n} X_i^6 = \frac{1}{42} n(n+1)(2n+1)(3n^4+6n^3-3n+1)$$

and thus said least squares cubic curved line of equation (2) can be found by operations of said determinants of (7)~(11) only by calculating $$\sum_{i=1}^{n} Y_i, \quad \sum_{i=1}^{n} X_i Y_i, \quad \sum_{i=1}^{n} X_i^2 Y_i, \quad \sum_{i=1}^{n} X_i^3 Y_i$$

and said least square cubic curved line of equation (2) thus found is subtracted from said equation (1) on said measurement data to thereby find said roughness curved line signal.

3. A device for measuring the surface roughness of a member, said device comprising:
 (i) a measurement means for measuring the surface contour of said member and for generating a surface contour measurement signal;
 (ii) an operation part for determining a cubic curved line corresponding to said surface contour from said measurement signal according to a method of least squares, and for removing said cubic curved line component from said measurement signal to generate a roughness curved line signal; and
 (iii) filter means connected in series with said operation part for removing a given bandwidth component from said roughness curved line signal to generate the roughness contour of said member.

4. A device as set forth in claim 3, wherein said operation part, when the measurement data of said measurement signal is expressed by $$Y_i = F(x_i) \quad (1)$$

a least squares cubic curved line (a correction curved line) to be found is expressed by $$Y_i = ax_i^3 + bx_i^2 + cx_i + d \quad (2)$$

a residual between said two equations (1) and (2) is expressed by $$U_i = Y_i - ax_i^3 - bx_i^2 - cx_i - d \quad (3)$$

a residual sum of squares S is expressed by $$S = \sum_{i=1}^{n} U_i^2 \quad (4)$$

$$= \sum_{i=1}^{n} (Y_i - aX_i^3 - bX_i^2 - cX_i - d)^2$$

$$= \sum_{i=1}^{n} \{Y_i^2 - 2Y_i(aX_i^3 + bX_i^2 + cX_i + d) +$$

$$a^2 X_i^6 + 2ab X_i^5 + b^2 X_i^4 + 2ac X_i^4 + 2ad X_i^3 +$$

$$2bc X_i^3 + 2bd X_i^2 + c^2 X_i^2 + 2cd X_i + d^2\}$$

and four simultaneous equations relating to coefficients a, b, c, and d are expressed by $$\frac{\delta S}{\delta a} = \sum_{i=1}^{n} \{-2Y_i X_i^3 + 2aX_i^6 + 2bX_i^5 + 2cX_i^4 + 2dX_i^3\} = 0 \quad (5)$$

$$\frac{\delta S}{\delta b} = \sum_{i=1}^{n} \{-2Y_i X_i^2 + 2aX_i^5 + 2bX_i^4 + 2cX_i^3 + 2dX_i^2\} = 0$$

$$\frac{\delta S}{\delta c} = \sum_{i=1}^{n} \{-2Y_i X_i + 2aX_i^4 + 2bX_i^3 + 2cX_i^2 + 2dX_i\} = 0$$

$$\frac{\delta S}{\delta d} = \sum_{i=1}^{n} \{-2Y_i + 2aX_i^3 + 2bX_i^2 + 2cX_i + 2d\} = 0$$

arranges said four simultaneous equations (5) into simultaneous equations $$\begin{pmatrix} \sum_{i=1}^{n} X_i^6, & \sum_{i=1}^{n} X_i^5, & \sum_{i=1}^{n} X_i^4, & \sum_{i=1}^{n} X_i^3 \\ \sum_{i=1}^{n} X_i^5, & \sum_{i=1}^{n} X_i^4, & \sum_{i=1}^{n} X_i^3, & \sum_{i=1}^{n} X_i^2 \\ \sum_{i=1}^{n} X_i^4, & \sum_{i=1}^{n} X_i^3, & \sum_{i=1}^{n} X_i^2, & \sum_{i=1}^{n} X_i \\ \sum_{i=1}^{n} X_i^3, & \sum_{i=1}^{n} X_i^2, & \sum_{i=1}^{n} X_i, & n \end{pmatrix} \begin{pmatrix} a \\ b \\ c \\ d \end{pmatrix} = \begin{pmatrix} \sum_{i=1}^{n} Y_i X_i^3 \\ \sum_{i=1}^{n} Y_i X_i^2 \\ \sum_{i=1}^{n} Y_i X_i \\ \sum_{i=1}^{n} Y_i \end{pmatrix} \quad (6)$$

and then solves said simultaneous equations (6) according to Cramer's law; if D is expressed by $$D = \begin{vmatrix} \sum_{i=1}^{n} X_i^6, & \sum_{i=1}^{n} X_i^5, & \sum_{i=1}^{n} X_i^4, & \sum_{i=1}^{n} X_i^3 \\ \sum_{i=1}^{n} X_i^5, & \sum_{i=1}^{n} X_i^4, & \sum_{i=1}^{n} X_i^3, & \sum_{i=1}^{n} X_i^2 \\ \sum_{i=1}^{n} X_i^4, & \sum_{i=1}^{n} X_i^3, & \sum_{i=1}^{n} X_i^2, & \sum_{i=1}^{n} X_i \\ \sum_{i=1}^{n} X_i^3, & \sum_{i=1}^{n} X_i^2, & \sum_{i=1}^{n} X_i, & n \end{vmatrix} \quad (7)$$

and thus said coefficients a, b, c, d are expressed by a $$a = \frac{1}{D} \begin{pmatrix} \sum_{i=1}^{n} X_i^3 Y_i, & \sum_{i=1}^{n} X_i^5, & \sum_{i=1}^{n} X_i^4, & \sum_{i=1}^{n} X_i^3 \\ \sum_{i=1}^{n} X_i^2 Y_i, & \sum_{i=1}^{n} X_i^4, & \sum_{i=1}^{n} X_i^3, & \sum_{i=1}^{n} X_i^2 \end{pmatrix} \quad (8)$$

-continued $$\begin{pmatrix} \sum_{i=1}^{n} X_i Y_i, & \sum_{i=1}^{n} X_i^3, & \sum_{i=1}^{n} X_i^2, & \sum_{i=1}^{n} X_i \\ \sum_{i=1}^{n} Y_i, & \sum_{i=1}^{n} X_i^2, & \sum_{i=1}^{n} X_i, & n \end{pmatrix}$$

(9)

$$b = \frac{1}{D} \begin{pmatrix} \sum_{i=1}^{n} X_i^6, & \sum_{i=1}^{n} X_i^3 Y_i, & \sum_{i=1}^{n} X_i^4, & \sum_{i=1}^{n} X_i^3 \\ \sum_{i=1}^{n} X_i^5, & \sum_{i=1}^{n} X_i^2 Y_i, & \sum_{i=1}^{n} X_i^3, & \sum_{i=1}^{n} X_i^2 \\ \sum_{i=1}^{n} X_i^4, & \sum_{i=1}^{n} X_i Y_i, & \sum_{i=1}^{n} X_i^2, & \sum_{i=1}^{n} X_i \\ \sum_{i=1}^{n} X_i^3, & \sum_{i=1}^{n} Y_i, & \sum_{i=1}^{n} X_i, & n \end{pmatrix}$$

(10)

$$c = \frac{1}{D} \begin{pmatrix} \sum_{i=1}^{n} X_i^6, & \sum_{i=1}^{n} X_i^5, & \sum_{i=1}^{n} X_i^3 Y_i, & \sum_{i=1}^{n} X_i^3 \\ \sum_{i=1}^{n} X_i^5, & \sum_{i=1}^{n} X_i^4, & \sum_{i=1}^{n} X_i^2 Y_i, & \sum_{i=1}^{n} X_i^2 \\ \sum_{i=1}^{n} X_i^4, & \sum_{i=1}^{n} X_i^3, & \sum_{i=1}^{n} X_i Y_i, & \sum_{i=1}^{n} X_i \\ \sum_{i=1}^{n} X_i^3, & \sum_{i=1}^{n} X_i^2, & \sum_{i=1}^{n} Y_i, & n \end{pmatrix}$$

(11)

$$d = \frac{1}{D} \begin{pmatrix} \sum_{i=1}^{n} X_i^6, & \sum_{i=1}^{n} X_i^5, & \sum_{i=1}^{n} X_i^4, & \sum_{i=1}^{n} X_i^3 Y_i \\ \sum_{i=1}^{n} X_i^5, & \sum_{i=1}^{n} X_i^4, & \sum_{i=1}^{n} X_i^3, & \sum_{i=1}^{n} X_i^2 Y_i \\ \sum_{i=1}^{n} X_i^4, & \sum_{i=1}^{n} X_i^3, & \sum_{i=1}^{n} X_i^2, & \sum_{i=1}^{n} X_i Y_i \\ \sum_{i=1}^{n} X_i^3, & \sum_{i=1}^{n} X_i^2, & \sum_{i=1}^{n} X_i, & \sum_{i=1}^{n} Y_i \end{pmatrix}$$

said operation part finds said coefficients a, b, c and d from said equations (7), (8), (9), (10), (11); if $X_i$ is expressed by a sequence of integers $1 \sim n$ to thereby obtain equations $$S_1 = \sum_{i=1}^{n} X_i = \frac{1}{2} n(n + 1)$$

$$S_2 = \sum_{i=1}^{n} X_i^2 = \frac{1}{6} n(n + 1)(2n + 1)$$

$$S_3 = \sum_{i=1}^{n} X_i^3 = \frac{1}{4} n^2(n + 1)^2$$

$$S_4 = \sum_{i=1}^{n} X_i^4 = \frac{1}{30} n(n + 1)(2n + 1)(3n^2 + 3n - 1)$$

$$S_5 = \sum_{i=1}^{n} X_i^5 = \frac{1}{12} n^2(n + 1)^2(2n^2 + 2n - 1)$$

$$S_6 = \sum_{i=1}^{n} X_i^6 = \frac{1}{42} n(n + 1)(2n + 1)(3n^4 + 6n^3 - 3n + 1)$$

then said operation part finds said least squares cubic curved line of equation (2) by operations of said determinants of (7)~(11) only by calculating $$\sum_{i=1}^{n} Y_i, \quad \sum_{i=1}^{n} X_i Y_i, \quad \sum_{i=1}^{n} X_i^2 Y_i, \quad \sum_{i=1}^{n} X_i^3 Y_i$$

and, said operation part subtracts said least square cubic curved line of equation (2) from said equation (1) on said measurement data to thereby find said roughness curved line signal.

5. A method of measuring the surface roughness of a member comprising the steps of:
   (i) converting the movements of a measuring part to electric signals for measuring the surface contour of said member;
   (ii) transmitting said electric signals to a synchronous detection circuit for generating a surface contour measurement signal;
   (iii) transmitting said surface contour measurement signal to a curve correction operation part for determining a cubic line and removing said cubic line from said surface contour measurement signal according to a method of least squares to generate a roughness curve line signal; and
   (iv) transmitting said roughness curve line signal to a filtering means for generating the roughness contour of said member.

6. A device for measuring the surface roughness of a member, said device comprising:
   (i) measuring means for detecting the movement of a measuring part and for measuring the surface contour of said member;
   (ii) converting means for converting the movements detected by said measuring means to electric signals;
   (iii) transmitting means for transmitting said electric signals to a detecting means for detecting and generating a surface contour measurement signal;
   (iv) curve correction operation means for receiving said surface contour measurement signal and for determining a cubic line and removing said cubic line from said surface contour measurement signal according to a method of least squares to generate a roughness curve line signal; and
   (v) filtering means for receiving and filtering said roughness curve line signal to generate the roughness contour of said member.

* * * * *